United States Patent
Bayer et al.

(10) Patent No.: US 6,841,604 B2
(45) Date of Patent: Jan. 11, 2005

(54) THERMALLY STABLE POLYESTER, PROCESS FOR ITS PREPARATION AND ITS USE

(75) Inventors: Uwe Bayer, Gessertshausen (DE); Jürgen Popp, Niedernhausen (DE); Thomas Wehrmeister, Rüsselsheim (DE)

(73) Assignee: INVISTA Technologies, S.a. r.l., Zurich (CH)

( * ) Notice: Subject to any disclaimer, the term of this patent is extended or adjusted under 35 U.S.C. 154(b) by 70 days.

(21) Appl. No.: 10/295,933

(22) Filed: Nov. 15, 2002

(65) Prior Publication Data

US 2003/0105214 A1 Jun. 5, 2003

(30) Foreign Application Priority Data

Nov. 30, 2001 (DE) .......................... 101 59 049

(51) Int. Cl.[7] .......................... C08K 3/20; C08K 3/08; C08L 67/00
(52) U.S. Cl. ................. 524/413; 428/364; 442/181; 442/327; 524/497; 524/537
(58) Field of Search .................. 524/497, 413, 524/537; 442/181, 327; 428/364

(56) References Cited

U.S. PATENT DOCUMENTS 4,476,272 A   10/1984   Pengilly

OTHER PUBLICATIONS

Hamada, S. et al., Improving Dispersibility of Carbon Black in Polyesters, Patent Abstract of Japan, Application No. JP 72–26106, File Date Mar. 16, 1972.

Watanabe, K. et al., Uniform Polyesters Containing Carbon Black Producing Smooth–Surface Films, Patent Abstract of Japan, Application No. JP 87–144831, File Date Jun. 10, 1987.

Kondo, F. et al., Polyester Coloring Composition, Patent Abstract of Japan, Application No. JP 70–120212, File Date Dec. 28, 1970.

Honma, M. et al., Black–Colored Polyesters, Patent Abstract of Japan, Application No. JP 73–65445, File Date Jun. 12, 1973.

*Primary Examiner*—Ana Woodward
(74) *Attorney, Agent, or Firm*—Gregory N. Clements

(57) ABSTRACT

A polyester with a carbon black content of up to 20% by weight, based on the polyester, is condensed, after transesterification of DMT with diol, or after esterification of terephthalic acid with diol, with the aid of a titanium-based catalyst. The carbon black is added in the form of a carbon black dispersion together with the polycondensation catalyst to the transesterification product or esterification product. The carbon black dispersion comprises gas black or furnace black and a dispersing agent, and these are dispersed in diol. The diameter of the carbon black particles is below that of carbon black particles in a polyester using an antimony compound as catalyst.

32 Claims, 3 Drawing Sheets

THERMALLY STABLE POLYESTER, PROCESS FOR ITS PREPARATION AND ITS USE

BACKGROUND OF THE INVENTION

1) Field of the Invention

A polyester with a carbon black content of up to 20% by weight, based on the polyester, is condensed, after transesterification of DMT with diol or after esterification of terephthalic acid with diol, with the aid of a titanium-based catalyst. The carbon black is added in the form of a carbon black dispersion together with the polycondensation catalyst to the transesterification product or esterification product. The carbon black dispersion comprises gas black or furnace black and a dispersing agent, and these are dispersed in diol. The diameter of the carbon black particles is below that of carbon black particles in a polyester using an antimony compound as catalyst.

2) Prior Art

Polyesters have gained major importance in very many fields of application. In particular, saturated polyesters are used for producing fiber materials, and they are also widely used for producing moldings, e.g. for beverage bottles. Very high requirements are placed upon the quality of the polyesters for satisfactory processing of these polyesters through extrusion processes, and for the further use of the extrudates, e.g. in the textile industry or the beverage industry. A particular requirement is that the processing properties and performance of polyester grades for particular processes are similar within very narrow limits. For production of microfilaments with titer below 1 dtex there can be no major additives present in the polyester, since these additives cause filament breakages during spinning.

Polyesters are usually prepared by esterifying aromatic dicarboxylic acids or transesterifying lower-aliphatic esters of aromatic dicarboxylic acids, using aliphatic diols, and then polycondensing until the molecular weight required for the planned use has been achieved.

Transesterification takes place in the presence of transesterification catalysts, which have to be deactivated after termination of the transesterification through addition of complexing agents. Complexing agents are phosphorus-containing compounds, such as phosphoric acid, phosphorous acid, and/or phosphonic acids, or derivatives of the same. After esterification or transesterification, the polycondensation takes place in the presence of a polycondensation catalyst, and antimony compounds, specifically antimony trioxide, have been widely adopted for large-scale industrial technology. It is known that titanium compounds can be used instead of antimony compounds as polycondensation catalysts for PET production.

For example, EP-A 0 699 700 discloses a thermally stable antimony-free polyester using a titanium compound as polycondensation catalyst. Also it discloses a transesterification catalyst metal in the form of catalytically inactive complexes with a phosphorus-containing compound or with a derivative of the same, and also cobalt, some of which is present in the form of catalytically inactive complexes with the phosphorus-containing compound. Additionally, an optical brightener may be used.

U.S. Pat. No. 4,476,272 discloses a polyester of high clarity and low haze, comprising a very low proportion of infra-red-absorbant material, e.g. carbon black. This polyester is used for producing preforms for bottles, and the carbon black used for this purpose has average particle sizes in the range from 10 to 500 nm, but the amount of the carbon black employed is less than 10 ppm, based on the weight of the polyester. The risk of agglomeration of these carbon particles yielding larger particles is very slight since the proportion of carbon black particles is very low.

If, for example, a polyester with carbon black content of 20% by weight, based on the total weight of the polyester, is produced it leads to agglomeration of the fine carbon black particles with particles sizes of from 50 to 500 nm in the admixed carbon black dispersion, to give larger carbon black particles with diameter in the range above 10 µm. Surprisingly, it has been found that the diameter of these agglomerated carbon black particles is dependent on the selected polycondensation catalyst, and it has become apparent that the antimony trioxide catalyst $Sb_2O_3$ results in relatively large agglomerated carbon black particles after polycondensation, and these increase the risk of filament breakages in the filaments spun from the polyester.

If microfilaments with titer below 1 dtex are spun from a polyester, the polyester may comprise only very small carbon black particles if filament breakages during spinning are to be avoided.

JP-A 72-26106 has disclosed the improvement of the distributions of carbon black in an antimony-containing polyester by adding fatty acid salt(s) of calcium, of magnesium, of strontium, or of barium. The polyester comprises $Sb_2O_3$, calcium acetate monohydrate $Ca(OAc)_2.H_2O$, carbon black, and sodium lignosulfonate as dispersing agent.

JP-A 87-144831 describes an antimony-containing polyester which comprises an ethylene-glycol-dispersed carbon black with average particle size of from 0.01 to 1.0 µm, and vinylpyrrolidone-vinyl acetate added as dispersing agent. The polyester extruded in the form of a film has a surface which is smoother than that of a polyester without dispersing agent.

Color dispersions are known from JP-A 70-120212 for the coloring of polyester, and are composed of carbon black and poly(vinylpyrrolidone) as dispersing agent, in each case dispersed in ethylene glycol.

JP-A 73-65445 describes a dispersion made from carbon black and copper phthalocyanine in ethylene glycol, the dispersion being added to an antimony-containing polyester.

The prior art prefers the use of an antimony compound, such as $Sb_2O_3$, as polycondensation catalyst together with a carbon black dispersion. A commonly used means of reducing the agglomeration of carbon black particles to a low level or preventing the same where possible, requires in the use of dispersing agents.

It is therefore an object of the present invention to provide a polyester with high carbon black content in which the agglomerated carbon black particles present are markedly smaller than in the prior art.

SUMMARY OF THE INVENTION

The object of the present invention is achieved by a polyester comprising from 1 to 100 ppm of titanium, based on the amount of polyester; from 0.01 to 20% by weight of carbon black, based on the weight of the polyester; and from 0 to 200 ppm of a phosphorous compound, based on the amount of polyester.

In one embodiment of the invention, the polyester comprises from 0.01 to 5% by weight of carbon black, preferably from 0.1 to 2% by weight of carbon black, and in particular from 0.4 to 1.6% by weight of carbon black, based in each case on the weight of the polyester.

The polycondensation catalyst is preferably one which may be selected from the group consisting of soluble or dispersible titanium compounds. The polycondensation catalyst is therefore composed of a titanium compound capable of dissolution in ethylene glycol. This titanium compound is advantageously a titanium alkoxide $Ti(OR)_4$ or titanium potassium oxalate $K_2TiO(ox)_2$.

In another embodiment of the invention, the polycondensation catalyst is composed of an ethylene-glycol-dispersible mixture made from titanium dioxide and silicon dioxide or metal oxide/titanium dioxide hydrate. Examples of the metal are an alkali metal or alkaline earth metal. The first polycondensation catalyst is a co-precipitate of $TiO_2$:$SiO_2$, whose titanium content is >1% by weight of titanium, based on the weight of the polycondensation catalyst. The proportion of metallic titanium in the polymer is from 5 to 50 ppm, based on the amount of the polyester.

In an embodiment of the invention, the carbon black is added in the form of a carbon black dispersion after the transesterification or, respectively, the esterification, and the dispersion of the carbon black takes place in a lower-aliphatic diol with admixture of a dispersing agent. The carbon black dispersion is advantageously composed of primary carbon black particles whose average primary particle size is below 100 nm, in particular from 13 to 50 nm, and of a dispersing agent and ethylene glycol. It is advantageous for the dispersing agent to be ionic and to have been selected from the group consisting of polyacrylate, modified polyacrylate, naphthalenesulfonic acid-formaldehyde resin, poly(vinypyrrolidone-co-3-methyl-1-vinylimidazolium methyl sulfate).

According to another embodiment of the invention, the dispersing agent is non-ionic and has been selected from the group consisting of polyvinylpyrrolidone, poly (vinylpyrrolidone-co-vinyl acetate), polyvinylcaprolactam, poly(vinylpyrrolidone-co-vinylcaprolactam), ethoxylated novolak, tristyrylphenol ethoxylate, tri-sec-butylphenyl ethoxylate.

The process for preparing a polyester based on aromatic dicarboxylic acids and on aliphatic diols, where a portion of the aromatic dicarboxylic acids may have been replaced by aliphatic dicarboxylic acids, comprises, after completing a transesterification reaction of dimethyl terephthalate and ethylene glycol or, respectively, an esterification of purified terephthalic acid which has been dispersed in a lower-aliphatic glycol, and polycondensation of these components with the aid of a Ti compound as polycondensation catalyst, admixing a carbon black dispersion which has been dispersed in a lower-aliphatic diol together with a dispersing agent, and mixing phosphorus-containing compounds as additives with the other components of the reaction.

The polyester of the invention is used for textile filaments, technical filaments, safety belts, nets, staple fibers, BCF fibers, monofilaments, fiber-nonwoven structures, and for providing strong coloring for films, shading of films, and for UV-protected films, and also for the production of masterbatches, and for injection-molded articles.

Surprisingly, when using the invention it was found that the polycondensation catalyst system, as well as the dispersing agents, has an effect on the formation of the carbon black agglomerates. The use of titanium as polycondensation catalyst results in formation of markedly smaller carbon black particles than the use of antimony as polycondensation catalyst.

An advantage achieved using the invention is that firstly the carbon black content in the polyester is high, permitting, for example, production of an intensely black colored filament yarn or black colored film, and secondly, due to the smaller diameters of the carbon black agglomerate particles, the risk of filament breakages during spinning of the polyester to give filaments is in particular markedly reduced.

DESCRIPTION OF THE DRAWINGS

Further illustration of the invention is given below.

DESCRIPTION OF THE PREFERRED EMBODIMENTS

PET Preparation

Figure 1:
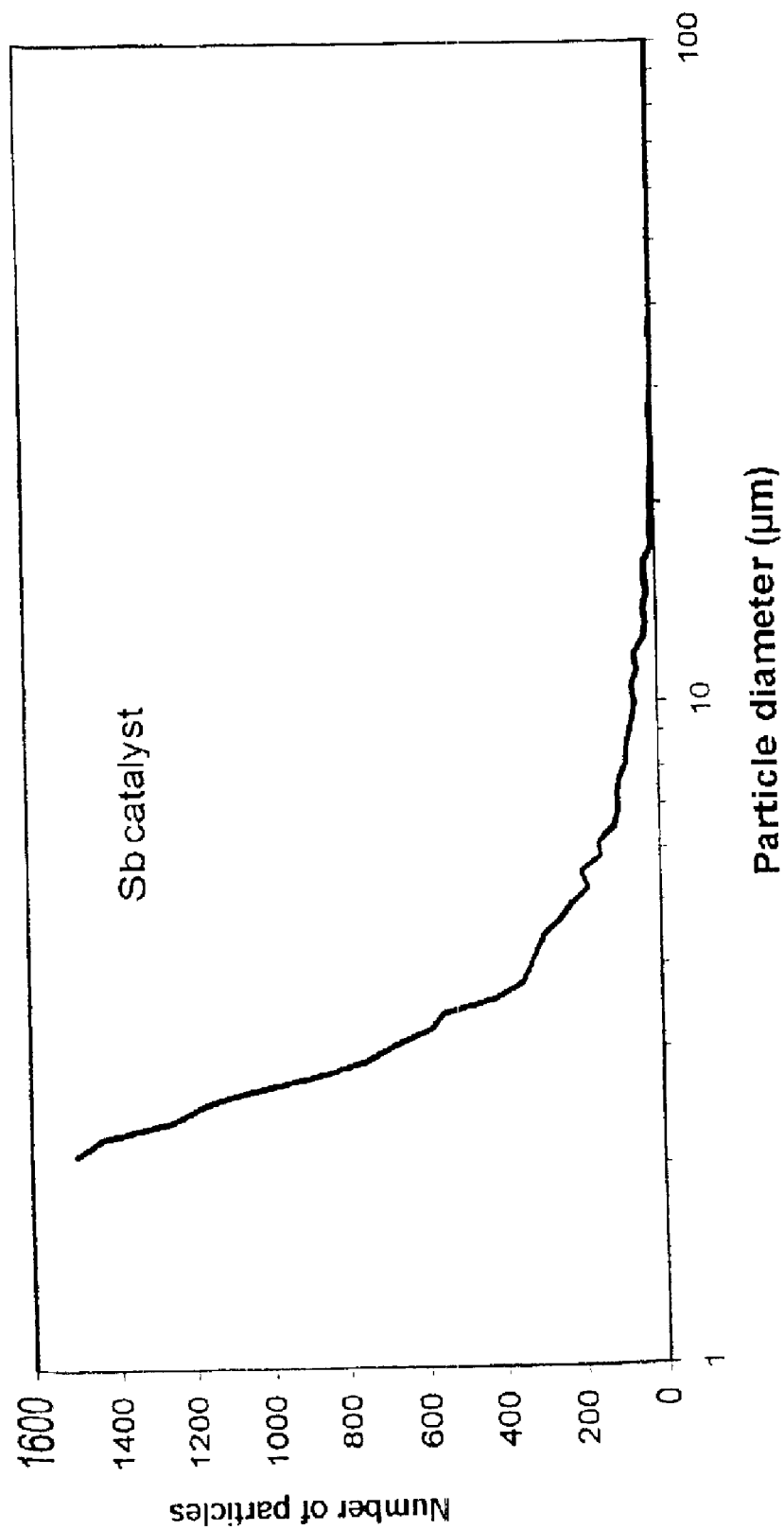
FIG. 1 shows the distribution of the number of carbon black particles as a function of particle diameter, using an antimony compound as polycondensation catalyst, and using a sodium salt of naphthalenesulfonic acid-formaldehyde polycondensate as dispersing agent for a carbon black dispersion.

The starting point for preparation of the polyester with up to 20% by weight of carbon black may either be a DMT (dimethyl terephthalate) method or the terephthalic acid method. The preparation process is known to the person skilled in the art, and is carried out using the familiar transesterification catalysts, and using the titanium-based polycondensation catalysts, under known process conditions according to the invention described here. The polyester described here may moreover be prepared by the known methods of melt condensation, solid-phase condensation, or similar processes.

DMT Method

The polyester of the invention may, for example, be prepared in a closed reaction vessel under inert gas. For this, the components dimethyl terephthalate (DMT) and ethylene glycol are transferred separately into the reaction vessel for the transesterification reaction, and mixed, with stirring. The ratio of DMT to ethylene glycol is from 1:1.5 to 1:3.5 preferably from 1:2 to 1:3.

The transesterification catalyst is then added. Suitable catalysts for the transesterification are compounds of Groups Ia (e.g. Li, Na, K), IIa (e.g. Mg, Ca), IIb (e.g. Zn) IVb (e.g. Ge), and VIIa (e.g. Mn) of the Periodic Table, in particular those which have some degree of solubility in the transesterification mixture, and also the salts of these with organic acids. Preference is given to the salts of the following metals: Mn, Zn, Ca, or Mg, in particular of manganese, with lower-aliphatic carboxylic acids, in particular those of acetic acid.

Examples of conditions for the transesterification reaction are atmospheric pressure at a temperature from about 100 to 200° C. The transesterification product is then mixed with a carbon black dispersion in a lower-aliphatic diol. The carbon black concentration of the carbon black dispersion is from 0.1 to 20% by weight, preferably from 5 to 15%.

By way of example, further additives are added, these being phosphorus-containing compounds (P compounds) known to the person skilled in the art. An example of the amount of each P compound added and mixed with the other components of the reaction is from 20 to 200 ppm (considering only the amount of P in the compound), preferably from 20 to 50 ppm, based on the amount of PET.

A Ti compound is also added as polycondensation catalyst. An example of the amount of polycondensation catalysts added is from 1 to 100 ppm (considering only the amount of Ti in the compound), preferably from 5 to 50 ppm. The amounts of the catalysts are based on the amount of PET.

The polycondensation is then carried out at reduced pressure at a temperature in the range from about 200 to 300° C., preferably from 250 to 295° C. Once the desired viscosity has been achieved, the resultant polyester is extruded and pelletized at temperatures of from 270 to 300° C. The resultant polyester is then dried and can then be further processed.

The details of the batchwise preparation of polyethylene terephthalate in a laboratory autoclave comprise two substeps:
a) transesterification of dimethyl terephthalate, using monoethylene glycol, to give diglycol terephthalate and
b) polycondensation in the autoclave.

To this end, in each case a transesterification is run in a glass apparatus and a polycondensation in the autoclave with approximately the same time parameters. Once the polycondensation has been completed, the autoclave is cleaned using monoethylene glycol. The transesterification product is polycondensed in the autoclave. The amounts used, the method, and the other conditions are described below. The vacuum in the autoclave is produced by a rotary-vane vacuum pump. This vacuum is controlled at certain time intervals.

The transesterification consists in the reaction of dimethyl terephthalate (DMT) with monoethylene glycol (MEG) in the melt, using a transesterification catalyst. The reaction which takes place here gives diglycol terephthalate (DGT) with separation of methanol. The transesterification reaction is initiated at a temperature of 150° C. and is completed at 220° C., the temperatures given being based on the temperature of the interior and not on the heating of the apparatus.

The DMT is delivered in flaked form, weighed out by an industrial method, and charged manually into the transesterification apparatus via a powder hopper. Monoethylene glycol and the transesterification catalyst manganese(II) acetate tetrahydrate are then added. The transesterification materials are kept under nitrogen. Once the DMT has been melted and reaction has begun, the methanol formed, and water where appropriate, is collected in a vessel, by way of a column and a condenser. The resultant methanol and water where appropriate and excess MEG are fed as solvent waste to an incinerator.

Once the transesterification has been completed, a stabilizer (here: mixed ester made from phosphoric acid with methanol, ethanol, and monoethylene glycol, PHM ester), a polycondensation catalyst, and a carbon black dispersion in glycol are added. The transesterification or esterification product is melted and fed to an autoclave via a heated product line from the transesterification apparatus.

Suitable titanium compounds used as polycondensation catalysts are titanium potassium oxalate of the chemical formula $K_2TiC_2O_5 \cdot 2H_2O$ and a co-precipitate composed of $TiO_2:SiO_2$. This co-precipitate is an oxide network in the form of a low-solubility white powder with grain size below 10 μm, which has low solubility in glycol but is readily dispersible. The titanium content is above 1% by weight of titanium, based on the weight of the co-precipitate. The stabilizer used is a phosphoric ester having short-chain alkyl groups and oligoglycol groups (PHM ester).

The transesterification product or esterification product is polycondensed in the autoclave after addition of the polycondensation catalyst. For this, the pressure is lowered to a subatmospheric pressure of from 0.2 to 0.5 mbar, in particular 0.3 mbar, and the temperature of the interior space is increased from 180 to 280° C. by means of a temperature program. The reaction is continued with separation of MEG until the desired melt viscosity has been achieved. A correlation between the melt viscosity and the torque of the stirrer in the autoclave, allows the viscosity to be controlled without sampling the polymer and taking viscosity readings.

The condensation takes place in a stainless steel tank heated using biphenyl. Once the reaction has been completed, the polymer melt, kept under nitrogen, is discharged via an outlet in the base and, after cooling in a water bath, fed in the form of a strand to a pelletizer.

The reaction glycol is collected in a cooled container and then disposed of.

A rotary-vane vacuum pump is used to produce the subatmospheric pressure in the autoclave. The subatmospheric pressure here is regulated at certain time intervals during the process.

PTA Method

The polyester of the invention may be prepared in a closed reaction vessel under inert gas, for example. For this, the purified terephthalic acid (PTA) is dispersed in the lower-aliphatic glycol and mixed with the polycondensation catalyst.

An example of the amount of the polycondensation catalysts added is from 1 to 100 ppm, preferably from 5 to 50 ppm. The amounts of the catalysts are in each case based on the amount of PET.

The esterification is carried out under pressure at a temperature in the range from 200 to 290° C., preferably from about 220 to 290° C. The ratio of PTA to ethylene glycol is from 1:1.0 to 1:2.0 preferably from 1:1.05 to 1:1.8.

Once the esterification has been completed, the carbon black dispersion is then added. The carbon black is dispersed in a lower-aliphatic diol, the concentration of carbon black being from 0.1 to 50% by weight, preferably from 5 to 15% by weight.

By way of example, yet further additives are added, these being phosphorus-containing compounds (P compounds) known to the person skilled in the art. An example of the amount of each P compound added and mixed with the other components of the reaction is from 0 to 100 ppm P, preferably from 2 to 20 ppm P, based on the amount of PET.

The polycondensation is then carried out a temperature in the range from about 200 to 300° C., preferably from 250 to 295° C., at reduced pressure. Once the desired viscosity has been achieved, the resultant polyester is extruded at temperatures of from 270 to 300° C., and pelletized. The resultant polyester is then dried and can the be further processed.

Carbon Black Dispersion

To prepare the carbon black dispersion, gas black with pH below 7 or furnace black (flame black) with pH above 7 is used. The carbon black is dispersed in a lower-aliphatic diol with admixture of a dispersing agent. The carbon black used for the carbon black dispersion has primary carbon black particles whose average primary particle size is below 100 nm, in particular from 13 to 50 nm. The lower-aliphatic diol is advantageously ethylene glycol. The carbon black content of the dispersion is from 0.1 to 50% by weight, based on the weight of the dispersion. The carbon black content of the dispersion is in particular from 5 to 15% by weight, based on the weight of the dispersion. About 95% of the agglomerated carbon black particles in the polyester have a diameter which is from above 2 μm to below 10 μm.

The polyester comprises from 0.01 to 20% by weight of carbon black, based on the weight of the polyester, and in particular comprises from 0.1 to 2% by weight of carbon black. The polyester preferably comprises from 0.4 to 1.6% by weight of carbon black, based on the weight of the polyester.

The dispersing agent selected from the group consisting of polyacrylate, modified polyacrylate, naphthalenesulfonic acid-formaldehyde resin, poly(vinylpyrrolidone-co-3-methyl-1-vinylimidazolium methyl sulfate) is ionic. It is also possible to use non-ionic dispersing agents, for example those which may be selected from the group consisting of polyvinylpyrrolidone, poly(vinylpyrrolidone-co-vinyl acetate), polyvinylcaprolactam, poly(vinylpyrrolidone-co-vinylcaprolactam), ethoxylated novolak, tristyrylphenol ethoxylate, tri-sec-butylphenyl ethoxylate.

Dibutyl phthalate absorption according to ASTM D2414 and DIN 53 601 serves as a measure of the structure of the non-polar furnace blacks (assuming comparable specific surface areas). At the same time, it provides another measure for binder requirement: the "wetting point" of the carbon black. When DBP absorption is determined with the aid of a Brabender Plastograph, the test determines how much DBP in ml/100 g of carbon black can be added before the carbon black in a blade kneader loses its free-flowing character and becomes stiff due to the presence of more DBP than can be absorbed. This parameter permits predictions to be made of rheological behavior in fluid systems, including high-viscosity polymer melts.

For the polyesters of the invention, the DBP absorption ratio of the carbon black grades used is above 50 and the upper limit is below 150. The DBP absorption is preferably in the range from above 90 to below 130.

In one specific example, the carbon black dispersion is composed of from 8 to 12% by weight of gas black with average primary particle size of 25 nm, from 1 to 2% by weight of dispersing agent, and from 86 to 91% by weight of monoethylene glycol, each of the percentages by weight being based on the total weight of the carbon black dispersion.

In a laboratory-scale example, 30 g of gas black, 3 g of dispersing agent, and 267 g of monoethylene glycol are mixed in a vessel and the gas black is dispersed into the monoethylene glycol using an Ultra Turrax T50 stirrer (supplier IKA Labortechnik) at a rotation rate up to 24,000 rpm. During the dispersion procedure the vessel was cooled in a water bath.

The gas black is in powder form and its pH is 4.5. The screen residue is below 300 ppm and the ashing residue is 0.02% by weight. A dispersing agent which may be used is a sodium salt of naphthalenesulfonic acid-formaldehyde polycondensate. The PHM ester used as stabilizer is a phosphorus compound which deactivates the transesterification catalyst manganese(II) acetate tetrahydrate. This phosphoric ester has the following formula:

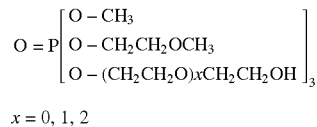

$x = 0, 1, 2$

In another example, 300 g of a carbon black dispersion are prepared from 30 g of furnace black, 3 g of ethoxylated novolak, 3 ppm of antifoam, and 267 g of MEG, the manner of mixing the components with one another and dispersing them being the same as in the example described above using gas black. Using this carbon black dispersion, the polyester made from 2,000 g of DMT, 1,200 ml of MEG, 326 ppm of $Mn(ac)_2 \times 4\ H_2O$, 27 ppm of P in the form of PHM ester, and 15 ppm of Ti (from 111 ppm of $K_2TiO(ox)_2$) then comprises 1.5% by weight of carbon black, based on the polyester.

EXAMPLES

In Table 1 below the carbon black particle sizes are listed for a comparative example 1 and also for the inventive examples 2 to 5. It can be seen from Table 1 that the number of carbon black particles with diameter above 10 μm is about twice as great when using an antimony trioxide catalyst in the standard PET as when using a titanium catalyst for the polycondensation. The proportion of titanium in the polyester is given in ppm.

The distribution of the carbon black particles was measured in a liquid specimen of 20 ml in 128 channels, the threshold value being 2.03 μm, using an Accusizer device, model 770 from Particle Sizing Systems Inc., California, USA. For the examples presented in Table 1 the relative particle size distribution for the percentage proportions 5%, 90% and 95% of the total number of carbon black particles, the particle diameters and the number of particles whose diameter is above 10 μm are given.

TABLE 1

| Example No. | Specimen No. | PC catalyst/- dispersing agent | Relative particle size distribution | | | Particle size > 10 μm per g of specimen · $10^3$ |
| --- | --- | --- | --- | --- | --- | --- |
| | | | 5% (μm) | 90% (μm) | 95% (μm) | |
| Comp. Ex. 1 | La 221 | Standard polyester with 1.5% of carbon black | 2.09 | 5.83 | 8.05 | 611 |
| Ex. 2 | LA 216 | 10 Ti/resin | 2.09 | 6.15 | 8.50 | 191 |
| Ex. 3 | LA 227 | 10 Ti/PVP | 2.09 | 7.06 | 9.72 | 277 |
| Ex. 4 | LA 242 | 15 Ti/PVP | 2.07 | 3.40 | 4.69 | 343 |
| Ex. 5 | LA 243 | 20 Ti/PVP | 2.08 | 3.05 | 3.40 | 307 |

Comparative example 1 represents a standard polyester with 1.5% of carbon black and with antimony trioxide $Sb_2O_3$ as polycondensation catalyst.

Inventive examples 2 to 5, 9 and 6 were carried out on laboratory scale using $K_2TiO(ox)_2 \times 2\ H_2O$ and, as appropriate, the co-precipitate $TiO_2:SiO_2=9:1$ as polycondensation catalyst and are listed below in table 2. The proportion of carbon black for examples Nos. 1 to 6 and 9 was in each case 1.5% by weight in the polyester. Examples Nos. 7 and 8 were carried out using antimony trioxide and $K_2TiO(ox)_2 \times 2\ H_2O$ as polycondensation catalyst with carbon black content of 0.45% by weight in the polyester. Table 2 gives the polycondensation (PC) catalysts, the PC times and transesterification (TE) times, the intrinsic viscosity (IV), and the color values L* and b*. IV is measured in dichloroacetic acid at 25° C.

For the examples of Table 2 the mixing specifications in relation to the components of the polyester are given below, including the respective carbon black dispersion and the operating data, which include not only the PC and TE times, but also the stirrer torque increase at the end of the polycondensation and the chip yield.

TABLE 2

| No. | Carbon black (% by wt) | Mn (ppm) | P (ppm) | Sb (ppm) | IV (dl/g) | L* | b* |
|---|---|---|---|---|---|---|---|
| 1 Standard PET | 1.5 | 73 | 26 | 408 | 0.623 | 23.3 | −0.4 |

| No. | Carbon black (% by wt) | PC catalyst | TE time (min) | PC time (min) | IV (dl/g) | L* | b* |
|---|---|---|---|---|---|---|---|
| 2 | 1.5 | $K_2TiO(ox)_2$ | 225 | 106 | 0.644 | 23.6 | −0.3 |
| 3 | 1.5 | $K_2TiO(ox)_2$ | 210 | 152 | 0.655 | 23 | −0.4 |
| 4 | 1.5 | $K_2TiO(ox)_2$ | 190 | 102 | 0.646 | 23.9 | −0.4 |
| 5 | 1.5 | $K_2TiO(ox)_2$ | 180 | 92 | 0.631 | 24.1 | −0.6 |
| 6 | 1.5 | $TiO_2/SiO_2$ | 205 | 105 | 0.637 | 23.6 | −0.5 |
| 7 | 0.45 | $Sb_2O_3$ | 203 | 126 | 0.592 | 22.2 | 4.0 |
| 8 | 0.45 | $K_2TiO(ox)_2$ | 190 | 82 | 0.607 | 22.9 | 4.0 |
| 9 | 1.5 | $K_2TiO(ox)_2$ | 196 | 109 | 0.661 | 24.4 | −0.4 |

Comparative Example 1

Standard Polyester

This is a standard polyester with 1.5% by weight of naphthalenesulfonic acid-formaldehyde polycondensate as dispersing agent, antimony trioxide as polycondensation catalyst, an Mn catalyst as transesterification catalyst, and a PHM ester as phosphorus compound.

Example 2

LA216 $K_2TiO(ox)_2 \times 2\ H_2O$
2.1 Mixing Specification:
    2,000 g of DMT,
    1,200 ml of monoethylene glycol (MEG),
    326 ppm of $Mn(ac)_2 \times 4\ H_2O$,
    27 ppm of P in the form of PHM ester
    10 ppm of Ti
    1.5% of carbon black dispersion
    300 g of carbon black dispersion composed of:
    30 g of carbon black and 3 g of naphthalenesulfonic acid-formaldehyde polycondensate, and 267 g of MEG
2.2 Operating Data:
    Transesterification time: 225 min; methanol/glycol amount: 890 ml
    Polycondensation time: 106 min; torque increase 11.0 Nm;
    Chip yield: 1,588 g Example 3

LA227 $K_2TiO(ox)_2 \times 2\ H_2O$/PVP
3.1 Mixing Specification:
    2,000 g of DMT,
    1,200 ml of monoethylene glycol (MEG),
    326 ppm of $Mn(ac)_2 \times 4\ H_2O$,
    27 ppm of P in the form of PHM ester
    10 ppm of Ti=74 ppm $K_2TiO(ox)_2 \times 2\ H_2O$
    1.5% of carbon black dispersion
    300 g of carbon black dispersion composed of:
    30 g of carbon black and 3 g of PVP, and 267 g of MEG
3.2 Operating Data:
    Transesterification time: 210 min; methanol/glycol amount: 875 ml
    Polycondensation time: 152 min; torque increase 11.0 Nm;
    Chip yield: 1,537 g Example 4

LA242 $K_2TiO(ox)_2 \times 2\ H_2O$/PVP
4.1 Mixing Specification:
    2,000 g of DMT,
    1,200 ml of monoethylene glycol (MEG),
    326 ppm of $Mn(ac)_2 \times 4\ H_2O$,
    27 ppm of P in the form of PHM ester
    15 ppm of Ti=111 ppm $K_2TiO(ox)_2 \times 2\ H_2O$
    1.5% of carbon black dispersion
    300 g of carbon black dispersion composed of:
    30 g of carbon black and 3 g of PVP, and 267 g of MEG
4.2 Operating Data:
    Transesterification time: 190 min; methanol/glycol amount: 870 ml
    Polycondensation time: 102 min; torque increase 11.0 Nm;
    Chip yield: 1,572 g Example 5

LA243 $K_2TiO(ox)_2 \times 2\ H_2O$/PVP
5.1 Mixing Specification:
    2,000 g of DMT,
    1,200 ml of monoethylene glycol (MEG),
    326 ppm of $Mn(ac)_2 \times 4\ H_2O$,
    27 ppm of P in the form of PHM ester
    20 ppm of Ti=148 ppm $K_2TiO(ox)_2 \times 2\ H_2O$
    1.5% of carbon black dispersion
    300 g of carbon black dispersion composed of:
    30 g of carbon black and 3 g of PVP, and 267 g of MEG
5.2 Operating Data:
    Transesterification time: 180 min; methanol/glycol amount: 890 ml
    Polycondensation time: 92 min; torque increase 11.0 Nm;
    Chip yield: 1,501 g Example 6

LA217 C94
6.1 Mixing Specification:
    2,000 g of DMT,
    1,200 ml of monoethylene glycol (MEG),
    326 ppm of $Mn(ac)_2 \times 4\ H_2O$,
    27 ppm of P in the form of PHM ester 10 ppm of Ti=18.5 ppm of C94
1.5% of carbon black dispersion
300 g of carbon black dispersion composed of:
 30 g of carbon black and 3 g of naphthalenesulfonic acid-formaldehyde polycondensate, and 267 g of MEG
6.2 Operating Data:
 Transesterification time: 205 min; methanol/glycol amount: 865 ml
 Polycondensation time: 105 min; torque increase 11.0 Nm;
 Chip yield: 1,665 g Examples Using 0.45% of Carbon Black in the Polyester Example 7

LA268 (reference)
7.1 Mixing Specification:
 2,000 g of DMT,
 1,200 ml of monoethylene glycol (MEG),
 326 ppm of $Mn(ac)_2 \times 4\ H_2O$,
 27 ppm of P in the form of PHM ester
 601 ppm of $Sb_2O_3$
 0.45% of carbon black dispersion
 90 g of carbon black dispersion composed of:
  9 g of carbon black and 0.9 g of PVP and 80.1 g of MEG
7.2 Operating Data:
 Transesterification time: 203 min; methanol/glycol amount: 870 ml
 Polycondensation time: 126 min; torque increase 7.0 Nm;
 Chip yield: 1,656 g Example 8

LA269
8.1 Mixing Specification:
 2,000 g of DMT,
 1,200 ml of monoethylene glycol (MEG),
 326 ppm of $Mn(ac)_2 \times 4\ H_2O$,
 27 ppm of P in the form of PHM ester
 15 ppm of Ti=148 ppm $K_2TiO(ox)_2 \times 2\ H_2O$
 0.45% of carbon black dispersion
 90 g of carbon black dispersion composed of:
  9 g of carbon black and 0.9 g of naphthalenesulfonic acid-formaldehyde polycondensate, and 80.1 g of MEG
8.2 Operating Data:
 Transesterification time: 190 min; methanol/glycol amount: 880 ml
 Polycondensation time: 82 min; torque increase 7.0 Nm;
 Chip yield: 1,662 g Example 9

LA 257 $K_2TiO(ox)_2$ furnace black+novolak
9.1 Mixing Specification:
 2,000 g of DMT,
 1,200 ml of monoethylene glycol (MEG),
 326 ppm of $Mn(ac)_2 \times 4\ H_2O$,
 27 ppm of P in the form of PHM ester
 15 ppm of Ti=111 ppm $K_2TiO(ox)_2$
 1.5% of carbon black dispersion
 300 g of carbon black dispersion composed of:
  30 g of furnace black and 3 g of ethoxylated novolak, 3 ppm of antifoam and 267 g of MEG
9.2 Operating Data:
 Transesterification time: 196 min; methanol/glycol amount: 860 ml
 Polycondensation time: 109 min; torque increase 11.0 Nm;
 Chip yield: 1,271 g The carbon black of comparative example 1 and of examples 2 to 8 is gas black, but furnace black may also be used, as in example 9. All that is then necessary is to use the appropriate dispersing agent for the furnace black.

Figure 2:
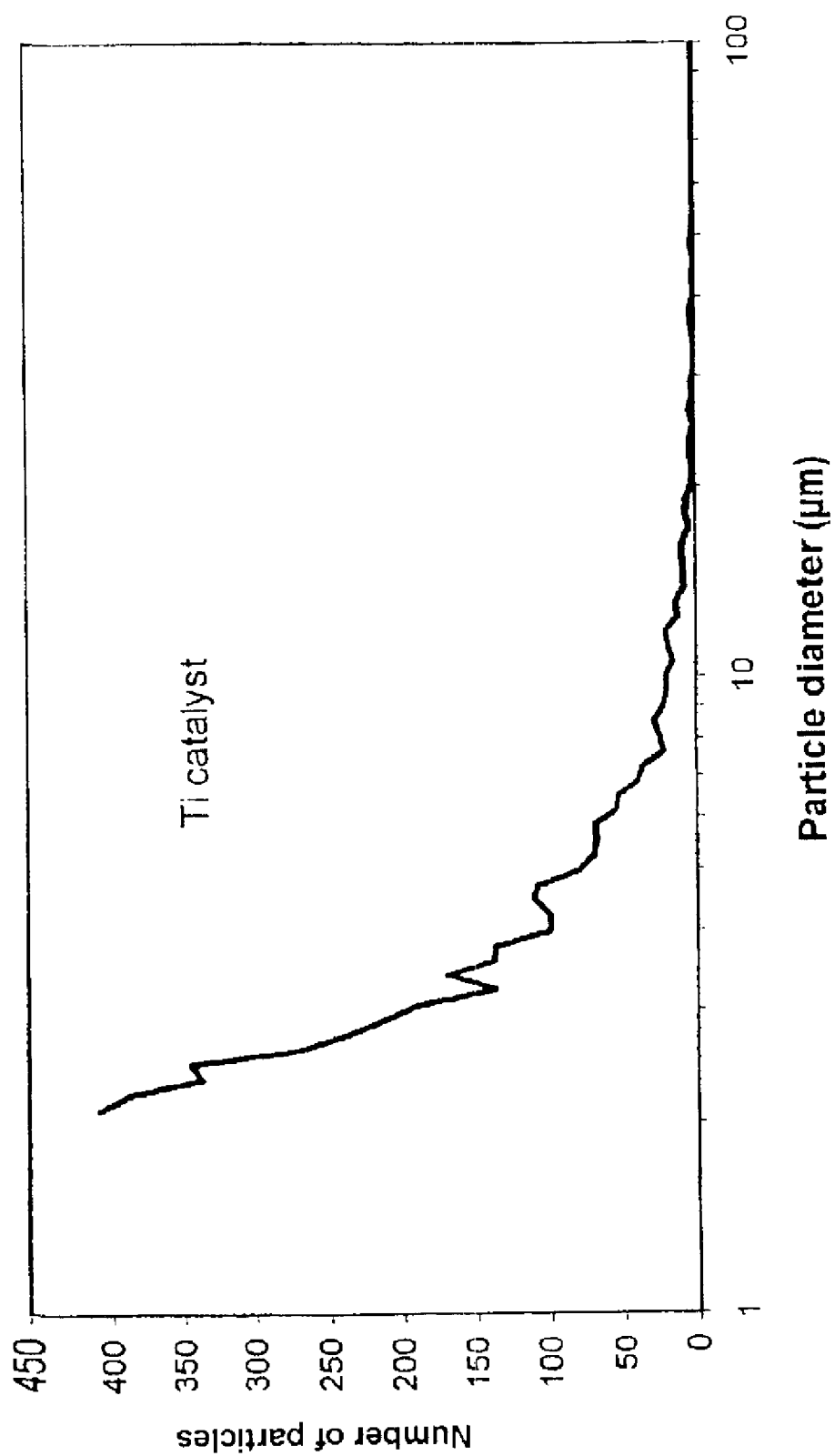
FIG. 2 shows the distribution of the number of carbon black particles as a function of particle diameter, using a titanium compound as polycondensation catalyst, and using a sodium salt of naphthalenesulfonic acid-formaldehyde polycondensate as dispersing agent for a carbon black dispersion.
Figure 3:
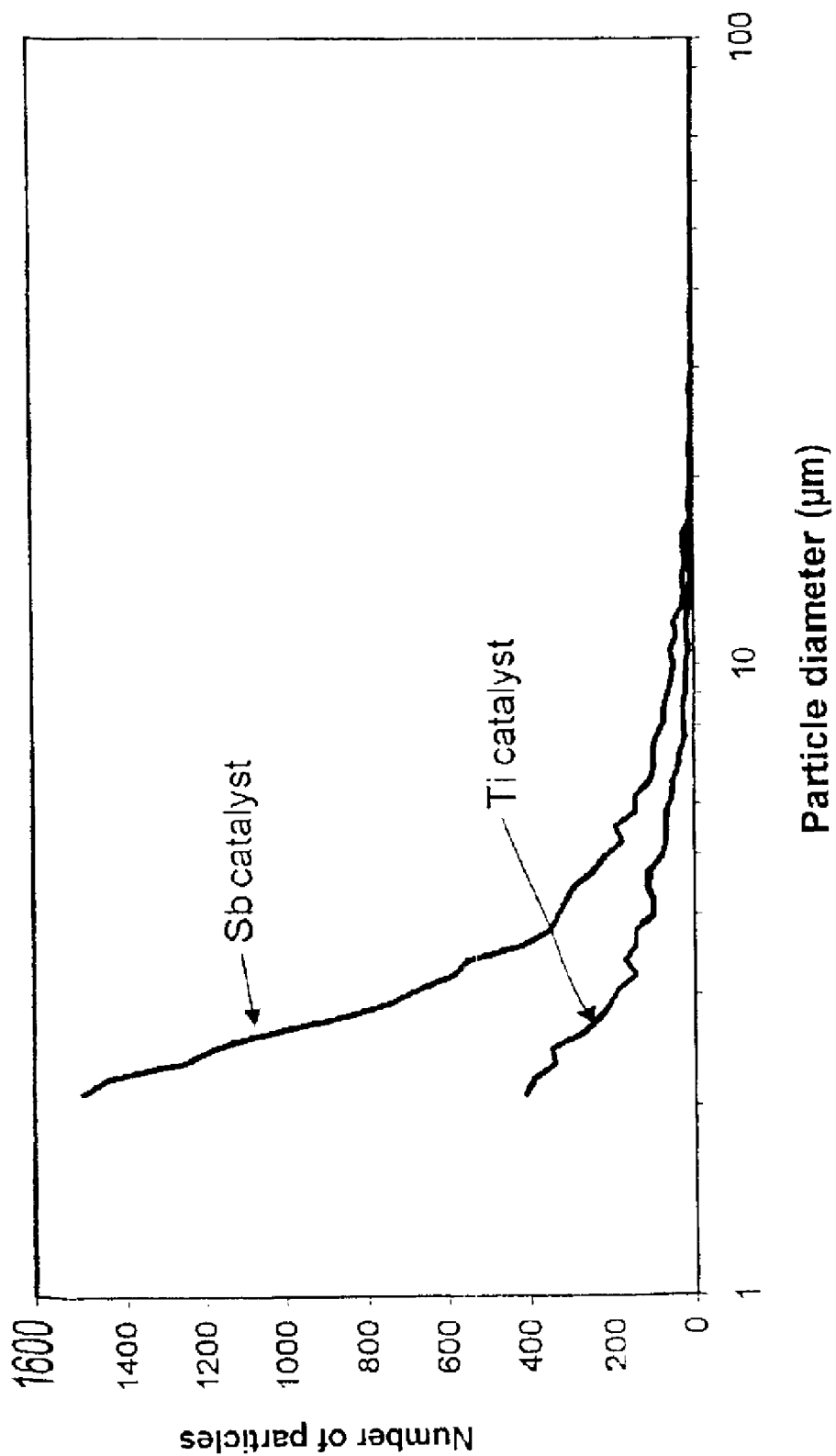
FIG. 3 shows a comparison of the distributions of the number of carbon black particles as a function of particle diameter, using an antimony compound and a titanium compound as polycondensation catalyst and in each case a sodium salt of naphthalenesulfonic acid-formaldehyde polycondensate as dispersing agent for a carbon black dispersion.

FIGS. 1 to 3 show the distribution of the carbon black particles as a function of particle diameters.

FIG. 1 here shows the distribution in comparative example 1 while FIG. 2 shows the distribution in inventive example 3 and FIG. 3 shows the comparison of the two distributions from FIGS. 1 and 2.

It can be seen from FIG. 3 that when using a titanium compound as polycondensation catalyst the number of carbon black particles whose diameter is above 10 μm is substantially below that obtained when using an antimony compound.

The polyester of the invention is used in the production of fibers, nonwoven materials, and films, as specified in further detail below.

Fiber Applications:
Textile Filaments
 e.g.: supermicro filaments (<0.5 dtex), micro filaments (0.5–1.0 dtex), fine filaments (1.0–2.5 dtex), medium filaments (2.5–7.0 dtex), coarse filaments (>7 dtex)
Technical Filaments:
 e.g. for safety belts, nets,
Staple Fibers:
 e.g. cotton type (1.3–2.8 dtex), wool type (3.3–10 dtex), for drapes (10–300 dtex)
BCF Fibers (Bulk Continuous Filament Fibers)
Monofilaments
Nonwoven:
 use for production of fiber nonwoven structures
Film Applications:
 depth in coloring of films
 films with UV protection
 shading in films
Preparation of Masterbatches as Additives for Polymer Components
Production of Molded Articles, e.g. Injection Moldings.

What is claimed is:

1. A thermally stable polyester resin comprising: polyester; from 1 to 100 ppm of titanium, in the form of a titanium compound, as a polycondensation catalyst, based on the amount of polyester; from 0.01 to 20% by weight of agglomerated carbon black, based on the weight of the polyester; and from 0 to 200 ppm of phosphorous, in the form of a phosphorous compound, based on the amount of polyester.

2. The polyester as claimed in claim 1, which comprises from 0.01 to 5% by weight of agglomerated carbon black, based on the weight of the polyester.

3. The polyester as claimed in claim 1, which comprises from 0.1 to 2% by weight of agglomerated carbon black, based on the weight of the polyester.

4. The polyester as claimed in claim 1, which comprises from 0.4 to 1.6% by weight of agglomerated carbon black, based on the weight of the polyester.

5. The polyester as claimed in claim 1, wherein the polycondensation catalyst is selected from the group consisting of soluble and dispersible titanium compounds.

6. The polyester as claimed in claim 5, wherein the polycondensation catalyst is composed of an ethylene-glycol-soluble titanium compound.

7. The polyester as claimed in claim 6, wherein the titanium compound is a titanium potassium oxalate.

8. The polyester as claimed in claim 6, wherein the titanium compound is a titanium alkoxide.

9. The polyester as claimed in claim 5, wherein the polycondensation catalyst is composed of an ethylene-glycol-dispersible mixture made from titanium dioxide and silicon dioxide or metal oxide-titanium dioxide hydrate.

10. The polyester as claimed in claim 9, wherein the polycondensation catalyst is a co-precipitate of $TiO_2:SiO_2$.

11. The polyester as claimed in claim 1, wherein the amount of titanium is 5 to 50 ppm, based on the amount of the polyester.

12. The polyester as claimed in claim 1, wherein the agglomerated carbon black is added in the form of a carbon black dispersion after the esterification, and wherein primary carbon black particles are dispersed in a lower-aliphatic diol, with admixture of a dispersing agent.

13. The polyester as claimed in claim 12, wherein the carbon black dispersion is composed of primary carbon black particles with an average primary particle size below 100 nm and of a dispersing agent and ethylene glycol.

14. The polyester as claimed in claim 12, wherein the dispersing agent is ionic and has been selected from the group consisting of polyacrylate, modified polyacrylate, naphthalenesulfonic acid-formaldehyde resin, and poly(vinylpyrrolidone-co-3-methyl-1-vinylimidazolium methyl sulfate).

15. The polyester as claimed in claim 12, wherein the dispersing agent is nonionic and has been selected from the group consisting of polyvinylpyrrolidone, poly(vinylpyrrolidone-co-vinyl acetate), polyvinylcaprolactam, poly(viinylpyrrolidone-co-vinylcaprolactam), ethoxylated novolak, tristyrylphenol ethoxylate, and tri-sec-butylphenyl ethoxylate.

16. The polyester as claimed in claim 12, wherein the carbon black is a gas black whose pH is below 7.

17. The polyester as claimed in claim 16, wherein the dibutyl phthalate absorption rate, given by the ratio of dibutyl phthalate in ml to 100 g of carbon black powder, is in the range from above 50 to below 150.

18. The polyester as claimed in claim 17, wherein the dibutyl phthalate absorption is in the range from above 90 to below 130.

19. The polyester as claimed in claim 12, wherein the carbon black is a furnace black (flame black) whose pH is above 7.

20. The polyester as claimed in claim 12, wherein the proportion of the dispersing agent is from 1 to 60% by weight, based on the dispersed carbon black.

21. The polyester as claimed in claim 12, wherein the carbon black content of the dispersion is from 0.1 to 50% by weight, based on the dispersion.

22. The polyester as claimed in claim 21, wherein the carbon black content of the dispersion is from 5 to 15% by weight, based on the dispersion.

23. The polyester as claimed in claim 12, wherein the carbon black dispersion is composed of primary carbon black particles with an average primary particle size from 13 to 50 nm and of a dispersing agent and ethylene glycol.

24. The polyester as claimed in claim 1, wherein 95% of the total number of agglomerated carbon black particles in the polyester have a diameter below 10 $\mu$m.

25. The polyester as claimed in claim 1, wherein the polyester is incorporated into at least one of a textile filament and a technical filaments for use in safety belts, nets, staple fibers, BCF fibers, and monofilaments.

26. The polyester as claimed in claim 1, wherein the polyester is incorporated into a fiber-nonwoven structures.

27. The polyester as claimed in claim 1, wherein the polyester is incorporated into a film and provides the film with at least one of high-strength coloring, shading, and UV protection.

28. The polyester as claimed in claim 1, wherein the polyester is incorporated into a master batch for use as an additive to polymer components.

29. The polyester as claimed in claim 1, wherein the polyester is incorporated into an injection-molded articles.

30. A process for preparing a polyester comprising: reacting dimethyl terephthalate and a lower-aliphatic diol or, respectively, terephthalic acid and a lower-aliphatic diol to produce a prepolymer blend; polycondensing said prepolymer blend with the aid of a Ti compound as polycondensation catalyst, admixing from 0.01 to 20% by weight of carbon black, based on the weight of the polyester, which has been dispersed in a lower-aliphatic diol together with a dispersing agent, and optionally mixing phosphorus-containing compounds as additives with the other components of the reaction.

31. The process as claimed in claim 30, wherein the polycondensation is carried out at a temperature of from 200 to 300° C. and at a subatniospheric pressure of from 0.2 to 0.5 mbar, until a desired IV of from 0.4 to 0.9 dl/g, measured in dichloroacetic acid at 25° C., has been achieved.

32. The process as claimed in claim 30, wherein for the carbon black dispersion from 0.1 to 50% by weight of gas black or furnace black, based on the total weight of the carbon black dispersion, in the form of primary particles with an average particle size of from 13 to 50 nm, and from 1 to 60% by weight of dispersing agent, based on the carbon black, are dispersed in ethylene glycol.

* * * * *